(12) United States Patent
Rieth (10) Patent No.: US 7,252,460 B2
(45) Date of Patent: Aug. 7, 2007

(54) INDEXABLE TIP FOR BEVELING BY MEANS OF A CONICAL MILLING HEAD

(76) Inventor: Stephan Rieth, Weimarer Strasse 12, D-66606 St. Wendel (DE)

( * ) Notice: Subject to any disclaimer, the term of this patent is extended or adjusted under 35 U.S.C. 154(b) by 31 days.

(21) Appl. No.: 10/547,604

(22) PCT Filed: Mar. 5, 2004

(86) PCT No.: PCT/DE2004/000439

§ 371 (c)(1),
(2), (4) Date: Sep. 1, 2005

(87) PCT Pub. No.: WO2004/078395

PCT Pub. Date: Sep. 16, 2004

(65) Prior Publication Data

US 2006/0269366 A1  Nov. 30, 2006

(30) Foreign Application Priority Data

Mar. 6, 2003  (DE) ................................ 103 10 098
May 5, 2003  (DE) ................................ 103 20 173

(51) Int. Cl.
*B23P 15/28* (2006.01)
(52) U.S. Cl. ...................................... 407/113; 407/116
(58) Field of Classification Search ................ 407/113, 407/114–117
See application file for complete search history.

(56) References Cited

U.S. PATENT DOCUMENTS

| | | | | |
|---|---|---|---|---|
| 3,701,187 A | * | 10/1972 | Erkfritz | ........................ 407/46 |
| 4,729,697 A | * | 3/1988 | Lacey | .......................... 407/42 |
| 5,006,020 A | | 4/1991 | Roos | |
| 5,368,418 A | * | 11/1994 | Bentjens et al. | ............. 407/114 |
| 5,382,118 A | * | 1/1995 | Satran et al. | .................. 407/42 |
| 5,913,643 A | | 6/1999 | Fowler et al. | |
| 6,203,251 B1 | * | 3/2001 | Oppelt et al. | .................. 407/48 |
| 6,773,209 B2 | * | 8/2004 | Craig | ........................... 407/63 |
| 6,902,354 B2 | * | 6/2005 | Satran | ........................ 407/116 |

FOREIGN PATENT DOCUMENTS

| | | |
|---|---|---|
| DE | 1 211 469 | 2/1966 |
| DE | 1 602 795 | 4/1970 |
| DE | 37 30 943 | 4/1989 |
| EP | 0 175 053 | 3/1986 |

* cited by examiner

Primary Examiner—Willmon Fridie, Jr.
(74) Attorney, Agent, or Firm—Friedrich Kueffner (57) ABSTRACT

Based on an indexable tip (1), which serves to bevel a cylindrical or conical milling head (12) and which has both ground cutting edges (7) as well as a bore hole (8) that extends from the free surface (2) to the supporting surface (3) of the indexable tip while provided for the passage of a fastening means (fixed plate) that has a head, and based on the ability to be reversed by turning around the indexable tip about the axis of the bore hole, the invention provides that the indexable tip also has the ability to be reversed by turning around which involves interchanging the prior supporting surface and free surface, both of these surfaces having a width between the cutting edges of greater than 5.5 mm. The ability to be reversed by turning around signifies that the indexable tip widens again from its thickness in the middle up to the supporting surface in order to form at least two other cutting edges. An improved seat of the indexable tip on the milling head is associated with the obtaining of the additional cutting edges that, as a consequence, lengthen the serviceable life, whereby achieving a greater quite running and thus precision of machining.

14 Claims, 8 Drawing Sheets

INDEXABLE TIP FOR BEVELING BY MEANS OF A CONICAL MILLING HEAD

BACKGROUND OF THE INVENTION

1. Field of the Invention

The invention relates to an indexable tip for beveling by means of a cylindrical or in particular, a conical milling head with ground cutting edges and a bore hole from the free surface to the supporting surface of the indexable tip for the passage of a fastening means ("fixed plate") which exhibits a head and has the ability to be reversed by turning around the indexable tip about the axis of the bore hole.

2. Description of the Related Art

Such an indexable tip is known from use. With only approximately 6.5 mm width between its two cutting edges and 5 mm width of supporting surface and less than 3 mm thickness, the known indexable tip has an oblong form with a trapezoid-shaped cross-section and can be arranged in relatively large numbers on a conical milling head. On the circumference of a conical milling head, for example which exhibits a smallest diameter of 25 mm and a cone angle of between 10 and 170°, there is room for eight indexable tips on the smallest circumference. Aside from the small width, the standing arrangement of the indexable tips contributes to this, since it does not require any free space in the direction of circumference for applying the fastening tool, normally a screwdriver. The ground, and therefore, in comparison with exclusively sintered indexable tips, precise and sharp edges allow a high cutting speed with little exertion of force. The arrangement on the cutting head with a small radius furthermore permits the creation of only a small torque which can be easily held up, so that a light construction of the machine including a light clamping of the workpiece is possible and the arrangement is also suitable for a mobile, hand milling machine.

The invention is based on the object to further increase the practical value of the indexable tip.

SUMMARY OF THE INVENTION

According to the invention this object is met in that the indexable tip also offers the ability to be reversed by turning around which involves interchanging the prior supporting surface and free surface.

Although the indexable tip intended according to the invention may only be placed on the milling head in smaller numbers than the known one; in the mentioned example, there are only five indexable tips instead of eight. The overall result, however, is more favorable.

The ability to be reversed by turning around signifies that the indexable tip widens again starting from its thickness in the middle toward the supporting surface for the formation of at least two additional cutting edges. The obtaining of additional cutting edges which accordingly lengthen the serviceable life is therefore also associated with an improved seat of the indexable tip on the milling head, whereby attaining a greater smoothness of running and thus precision of machining. The magnification of the bore hole and fastening by means of a stronger screw or the like made possible as a result of the overall widening of the indexable tip contributes hereto. The wider indexable tip incidentally has a higher stability. Since the indexable tip thanks to its wider supporting surface and different cross-section shape is also dimensioned thicker than according to the state of the art, one further has greater latitude to vary the wedge angle for a constant width of the indexable tip subject to a change of its thickness depending on the material to be processed and to set an advantageous rake angle as well as a suitable clearance angle; in spite of the reduced number of indexable tips the removal performance can even be enhanced in this way. Furthermore, the chips are removed better past the double faces which are bent toward each other.

Both surfaces mentioned will generally have a width of at least 5.5 mm, preferably 6 to 12 mm. The thickness of the cutting tip is normally 4 to 10 mm.

The wedge angle of the cutting edges formed at the even faces is preferably 40 to 75°. The wedge angle of the cutting edges formed at the concave faces is preferably 10 to 60°. The arrangement on corresponding seat surfaces of a milling head assigned to the indexable tips should preferably produce an effective rake angle at even faces of 6 to 47° and at concave faces of 15 to 75°, and a clearance angle of 2 to 25°.

Preferably and as a rule the indexable tip exhibits at those sides which feature possible faces, a grooving forming both concerned faces which, aside from possible inward or outward bends of its edges which form the cutting edges, has a continuously constant and mirror image cross-section relative to the midplane of the indexable tip which cuts the bore hole.

In this case grinding or if necessary regrinding of both the faces can be conducted very easily in one work step unlike numerous configurations of indexable tips known from another context in which both the faces are somewhat angularly displaced against each other.

Generally both concerned faces will be even and preferably located at an angle of 80 to 160° relative to each other.

Both faces may, however, also be concave corresponding to a grooving of round cross-section. This configuration permits a sharp wedge angle.

The wedge angle may be designed more sharply at the even faces by means of a narrow slot under the cutting edge in the face.

In special cases a narrow bevel can be ground at the faces and/or free surfaces in order to create a more obtuse wedge angle.

For the purpose of an additional increase in its service life, the indexable tip, as a result of a thickness increase raising both first-mentioned surfaces over the head of the intended fastening means with which the thickness of the indexable tip exceeds the depth of the intended seat of the indexable tip on the milling head, can be reground for sharpening the cutting edges.

In a first variation this indexable tip can be reground at the first-mentioned surfaces as well as at the faces, and one possible face opposing the respectively used face at the free surface is provided for exclusively supporting the indexable tip against the cutting force at one, preferably identically aligned sloping of the milling head in interaction with the fastening of the indexable tip on the seat of the milling head by means of the fastening means.

In a second variation the indexable tip is beveled at the first-mentioned surfaces in a flat angle of 2 to 10° toward the faces and can be reground at the bevel surfaces and is provided for configuration on a seat of the milling head which is inclined under the clearance angle which is enlarged by the bevel angle.

In the first variation the intended support enables a regrinding of the indexable tip on the first-mentioned surfaces in connection with a regrinding at the faces: Once both possible free surfaces, thus also the support surface of the indexable tip are ground, the support surface is again brought into contact with the seat surface of the tool as the possible faces are ground to an appropriate degree. At any rate a contact between the face located under the supported possible face and the tool is then no longer possible.

The provided support allows for this.

Prior to grinding a positive fitting engagement with a support at both possible faces could exist.

Preferably however, the indexable tip is assigned one milling head on which a free space extends a priori from the sloping to the seat surface and therefore the intended support is provided from the start. This support is basically advantageous inasmuch as it absorbs the cutting force fairly directly and excludes any shearing and/or bending stress of the indexable tip. The support is therefore generally preferred in the indexable tips according to the invention which, due to their notching at the faces are possibly somewhat sensitive to such stresses.

Independently therefrom a free space formed between the sloping and the seat surface is proposed as a further embodiment which is guided around the cutting edge(s) located there, so that it can take in any resulting burrs at the used cutting edges and these cannot disturb the support of the indexable tip.

In the second variation a support surface located on the seat surface between the bevels remains. Regrinding of the faces is not necessary. The indexable tip could insofar receive an abutment at the tool which grips into the angles between both possible faces located there. The indexable tip, however, can also be deployed on the same tool as it is necessitated in the first variation, and as mentioned, preferred.

Furthermore, the regrindable indexable tip, as already suggested, protrudes by about the thickness increase out of its seat on the tool. With regard to the stability of the indexable tip, the bore hole should be cylindrical, i.e., should not have a diameter bigger than necessary, respectively over a seat for the head of the fastening means in both areas of the thickness increase.

The indexable tips according to the invention can have in particular the shape of a rectangle or of a square.

BRIEF DESCRIPTION OF THE DRAWINGS

The drawings illustrate the embodiments of the invention.

DETAILED DESCRIPTION OF THE INVENTION

Figure 1:
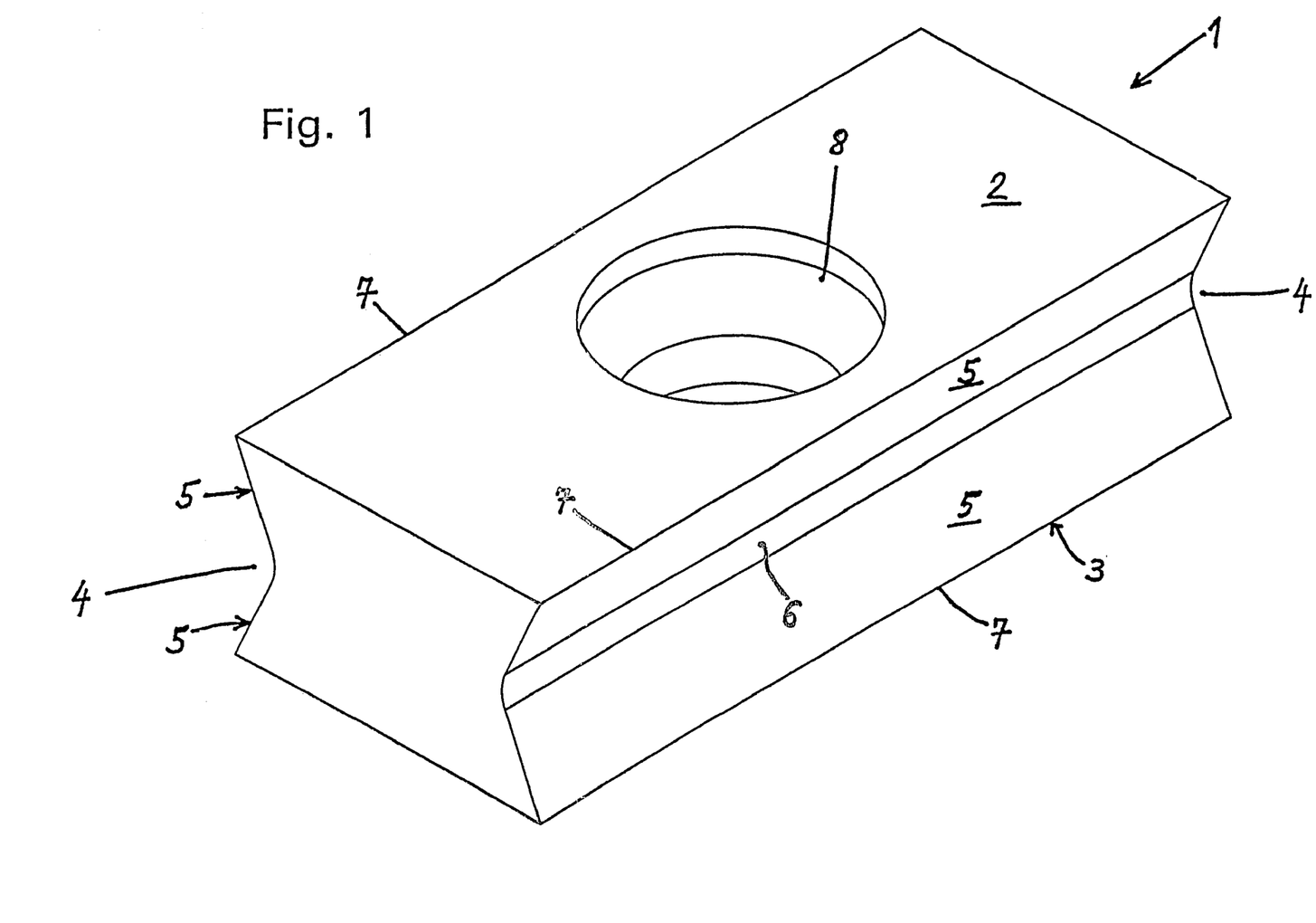
FIG. 1 shows an indexable tip for a milling head in an isometric view.

The indexable tip 1 shown in FIG. 1 is rectangular, i.e., it has a rectangular parallelepiped basic shape. Both the broadsides are intended for use as free surface 2 and supporting surface 3 and vice versa. At both the longitudinal narrow sides two possible faces 5 are formed each by a grooving 4 of continuously constant cross-section which is symmetrical to the midplane of the indexable tip, with a keyed transition 6 there between. Four linear possible cutting edges 7 result from cuts of the even faces 5 with the free surface 2 and the supporting surface 3 which presents a further possible free surface.

A centric bore hole 8 leading from the one broadside to the other exhibits on both sides of a cylindrical middle section 9 two conical seats 10 for a bolt head and a cylindrical section 11 located there above.

Figure 2:
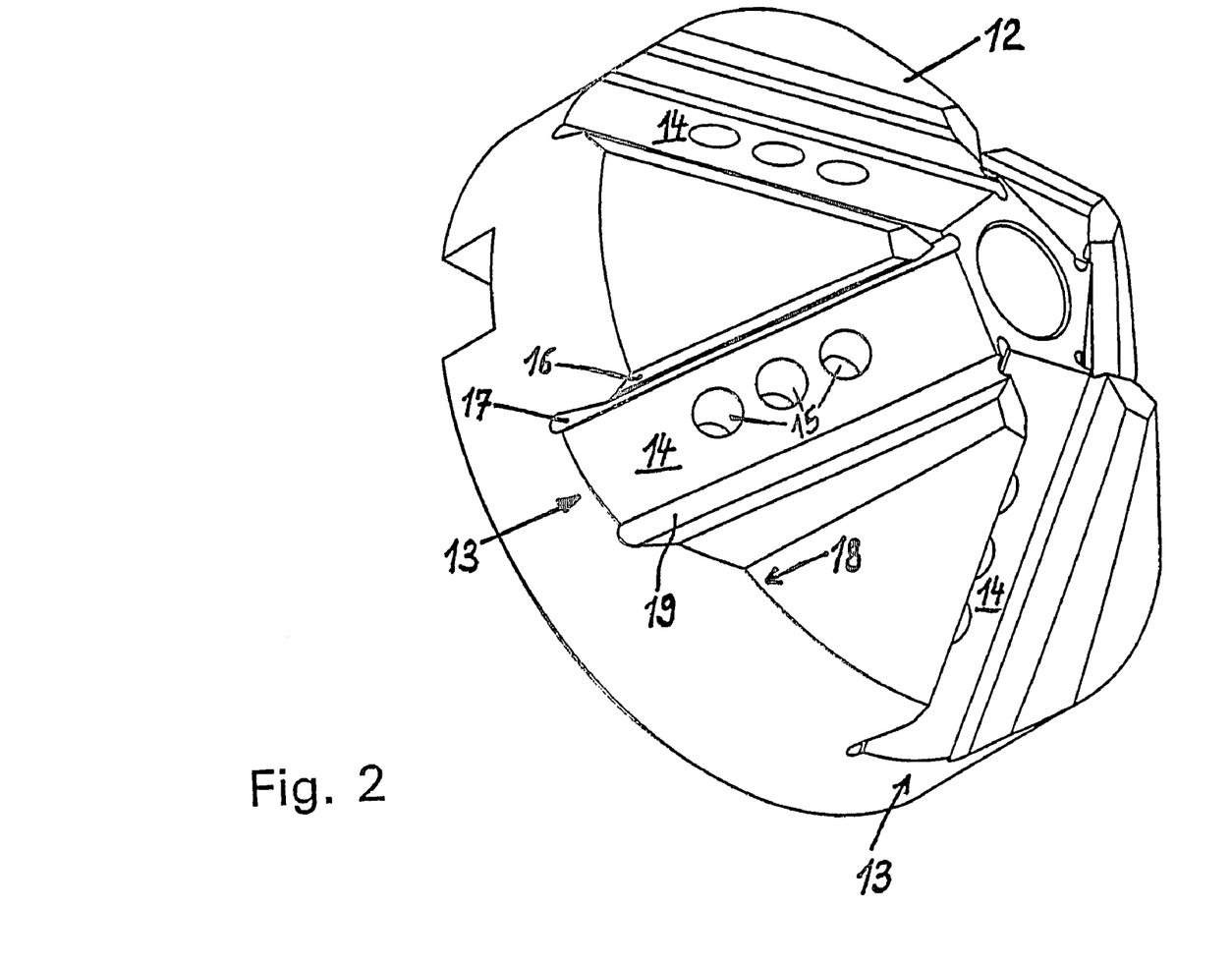
FIG. 2 shows the respective milling head in an isometric view.

FIG. 2 reveals a milling head 12 with five seats 13 for an indexable tip 1.

The seats 13 include each a seat surface 14 for the supporting surface 3 of the indexable tip, three tapped bores to be used optionally for a screw by means which the indexable tip 1 is to be fastened on the seat 13 using the bore hole 8, as well as a sloping 16 at which the possible face 5 opposing the effective face 5 at the free surface 2 (in distinction to the opposing face in the grooving 4) is positioned in the process.

The indexable tip protrudes here from its seat 13 by its thickness increase 35.

A narrow free space 17 extends from the sloping 16 along the adjacent possible face 5 and around its cutting edge 7. On the other side the indexable tip 1 lies open at a recess 18 and a section 19 of the milling head 12.

The arrow 20 makes the direction of movement clear, the dashed arrow 21 the stress from the cutting edge 7 and the chip flow across the faces 5.

The turning possibilities are apparent from the drawings.

In addition, the cutting edges 7 can be reground once all four cutting edges 7 are worn down.

If both the broadsides of the indexable tip 1 are ground for this purpose, which in itself would suffice in order to sharpen the cutting edges, then the groovings 4 must also be reground by such an amount that the supporting surface 3 of the indexable tip 1 touches the seat surface 14 of the milling head 12. The cutting edge 7 shown protruding at the top left in FIG. 3 therefore slips lower.

Figure 3:
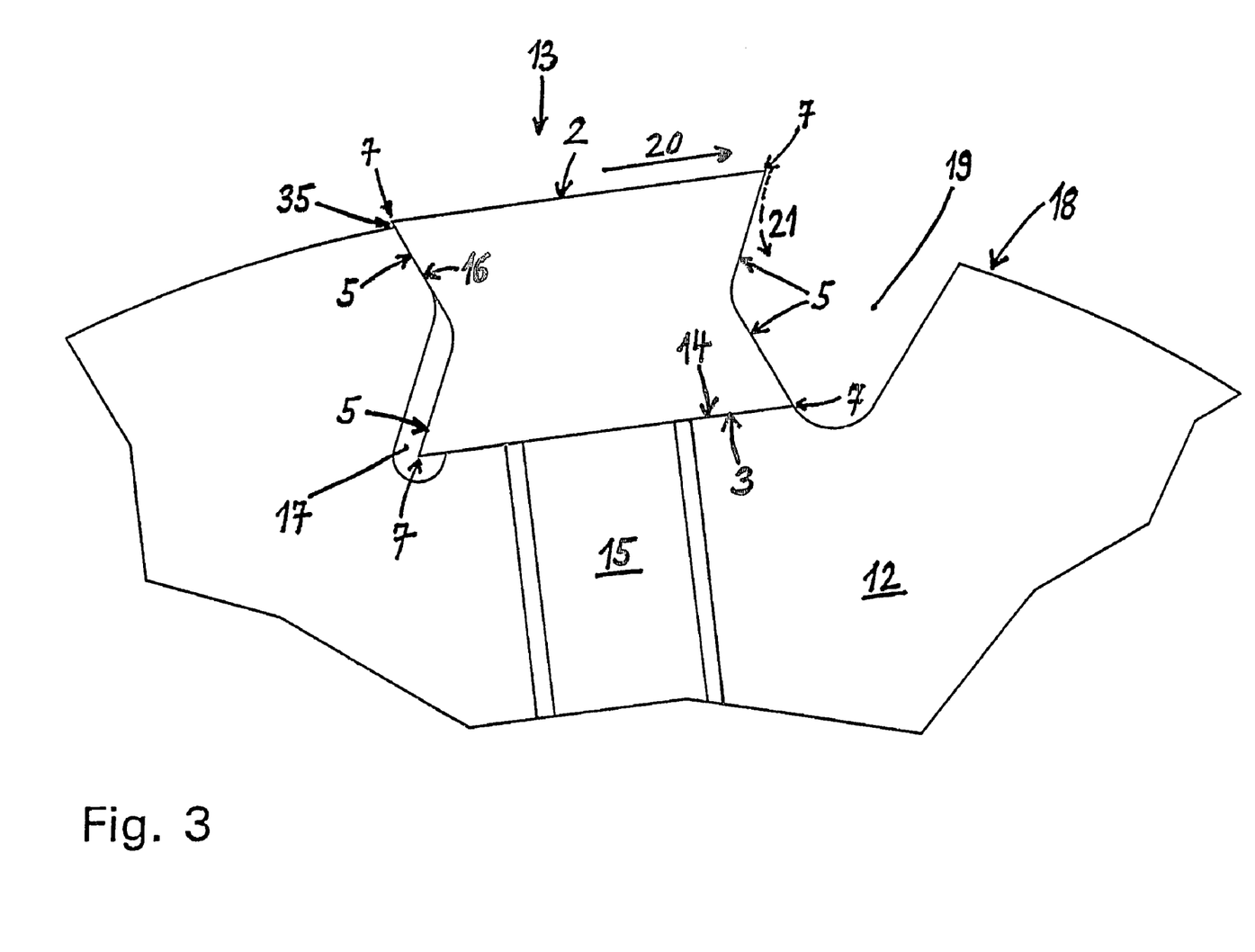
FIG. 3 shows part of a cross section through the milling head and the indexable tip.
Figure 4:
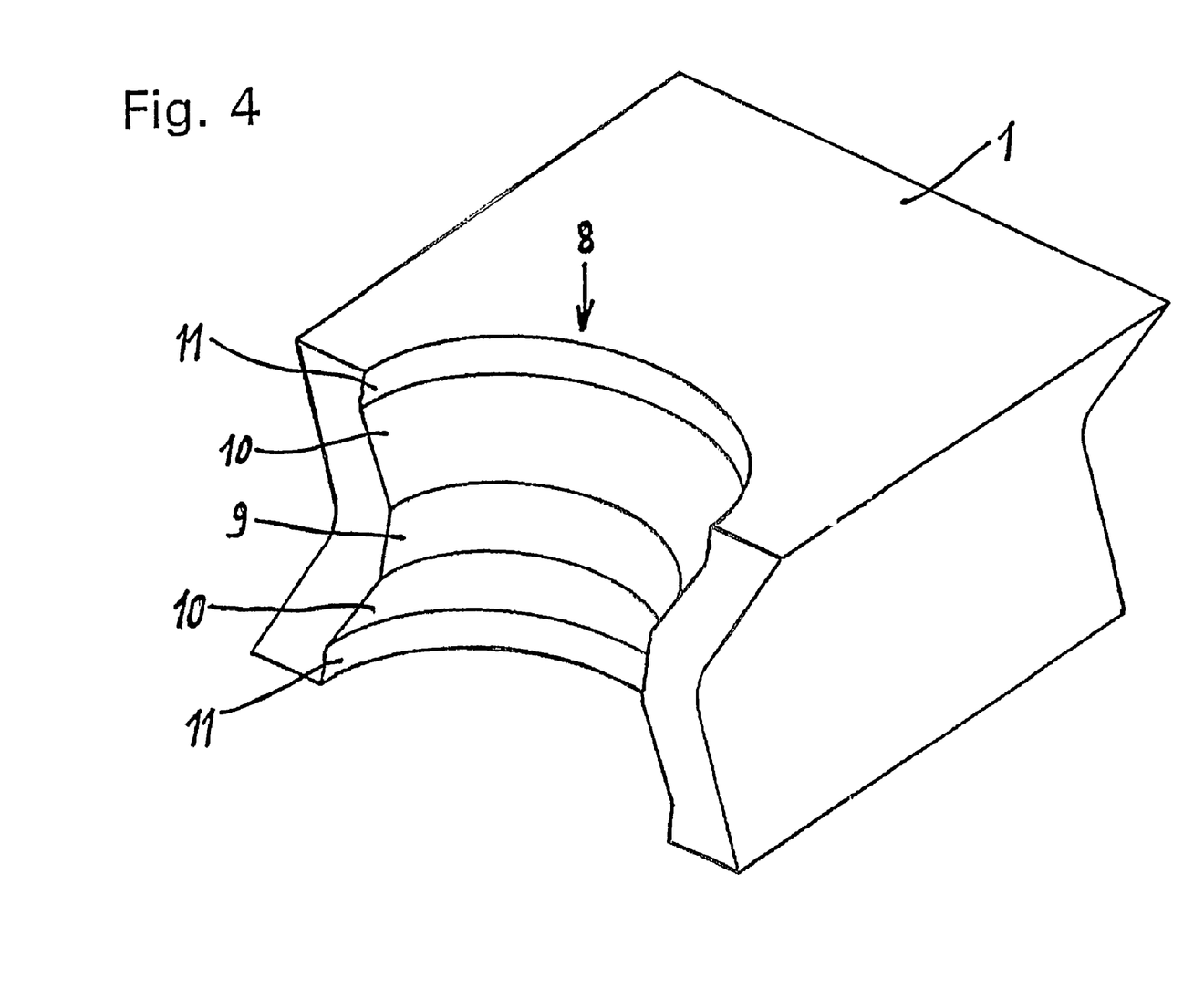
FIG. 4 shows the indexable tip in the approximately same isometric view as FIG. 1, cut diagonally across the middle.

The height of the cylindrical sections 11 of the bore hole 18 represents the material increase provided for grinding at the indexable tip 1.

The four edges at the ends of both broadsides could be beveled or rounded off in order to facilitate a complete penetration of the indexable tip into the material, wherein the sharp corners would interfere and would be exposed to wear and the danger of damage. This is especially suitable for shorter indexable tips positioned successively on the milling head.

Figure 5:
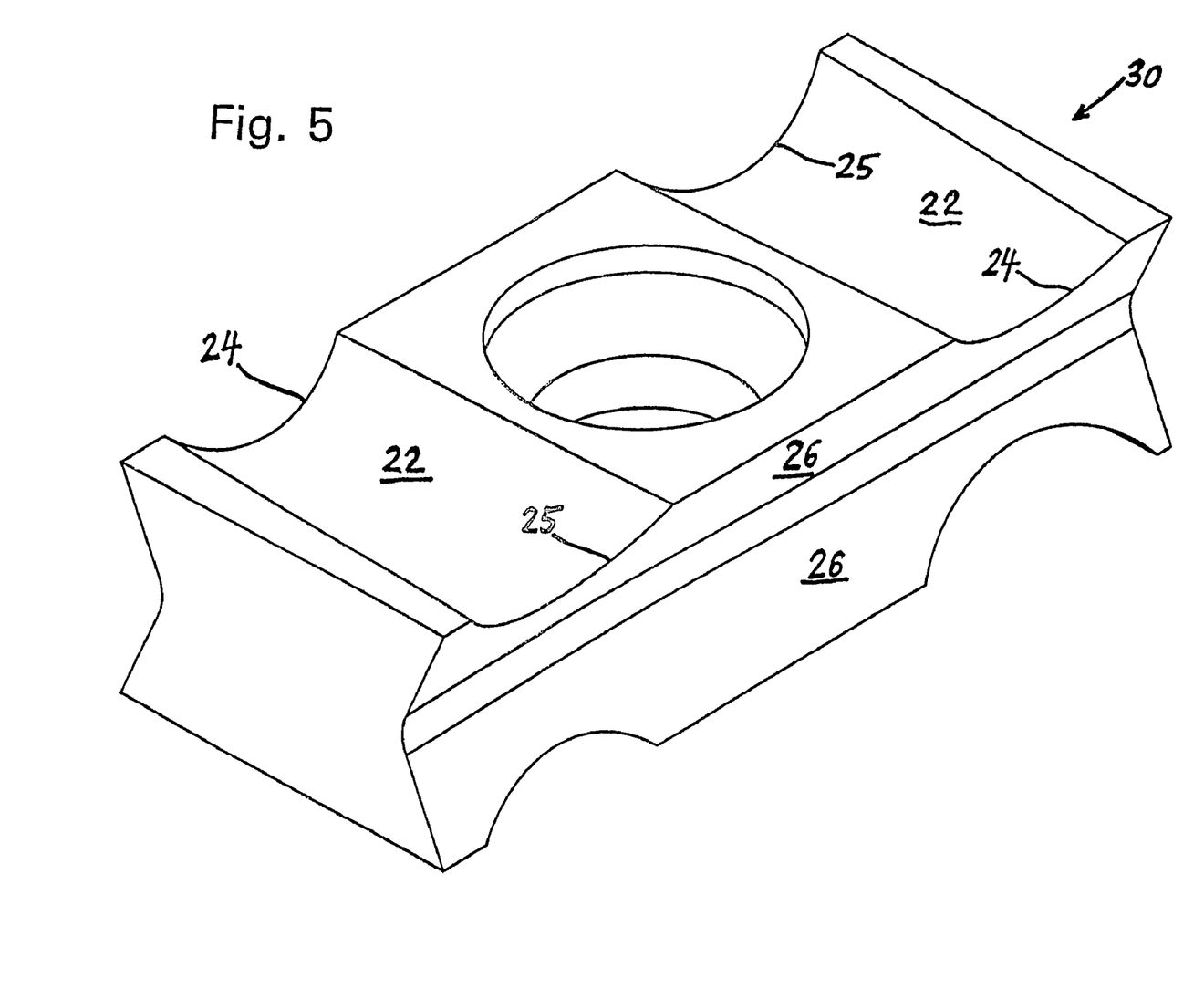
FIG. 5 shows a second indexable tip in an isometric view.

The indexable tip 21 shown in FIG. 5 also has a rectangular or rectangular parallelepiped basic shape. It differs from the indexable tip 1 by means of flat cavities 22 molded at its possible free surfaces, which in the illustration extend across the width of the free surface and each create an indented cutting edge of a quarter circle with their outlets at the possible faces. The indentations are denoted with 24 and 25; in consideration for the chip flow the smaller indentation 24 is preferably used as the cutting edge. The mirror symmetry of the faces denoted with 26 has incidentally remained the same. The configuration of the indexable tip is, taken for itself, new.

With the indentations 23 and 24 the cutting edge is provided with a form that allows edges to be rounded. Cutting for this purpose is only carried out with the indented cutting edge.

Another utilization possibility of the indexable tip is, only to cut with the linear cutting edges between and/or beyond the indentations and not with the indentation. Thus, cutting is carried out only with a shorter cutting edge in spite of a large and accordingly well supported cutting tip. The cutting edge can thereby penetrate into the material with less exertion of force. The material stopped at the indentations can then be removed by a following cutting tip whose cutting edge will again only be effective at a shorter length in the process. A third utilization possibility consists of working with the cutting edge at its full length, i.e., on the linear and on the indented sections, and thus thereby creating an ornamental relief.

Figure 6:
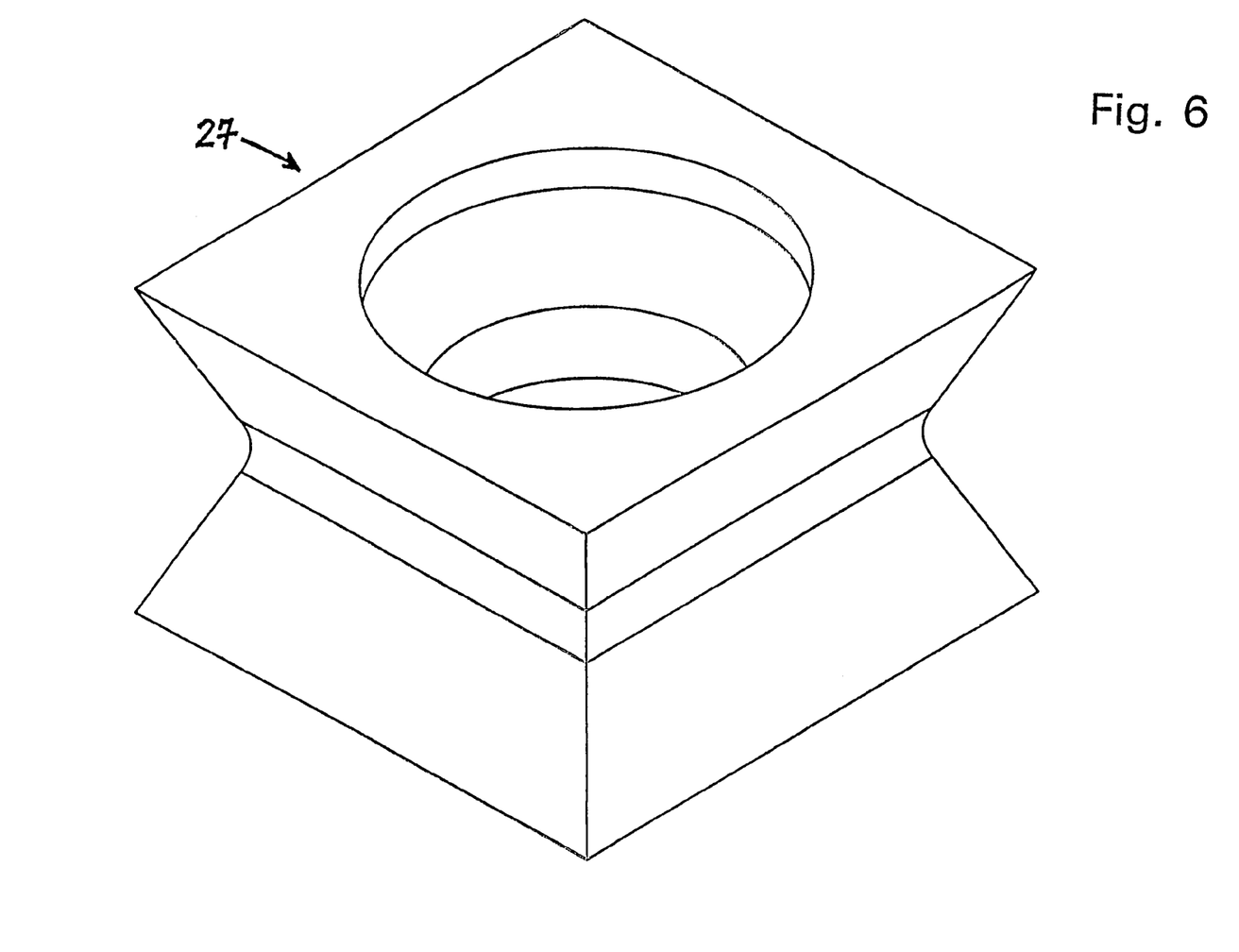
FIG. 6 shows a third indexable tip in an isometric view.

The indexable tip 27 according to FIG. 6 is a quadratic. It therefore provides eight cutting edges. The preceding illustration applies correspondingly.

Figure 7:
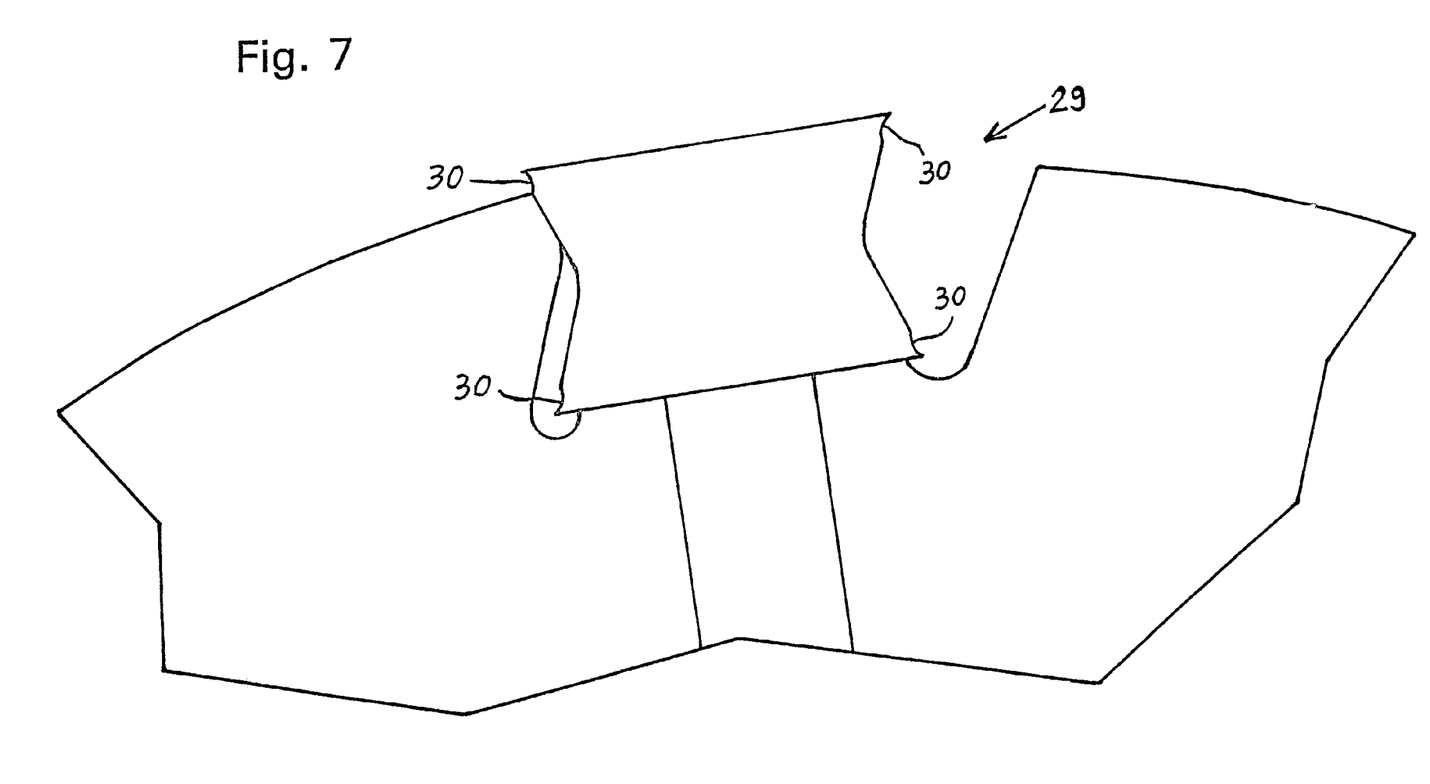
FIG. 7 shows a fifth indexable tip in cross-section corresponding to FIG. 3.

FIG. 7 reveals on the whole the same indexable tip as in FIG. 3, wherein however a narrow slot 30 each is molded under the cutting edges.

Figure 8:
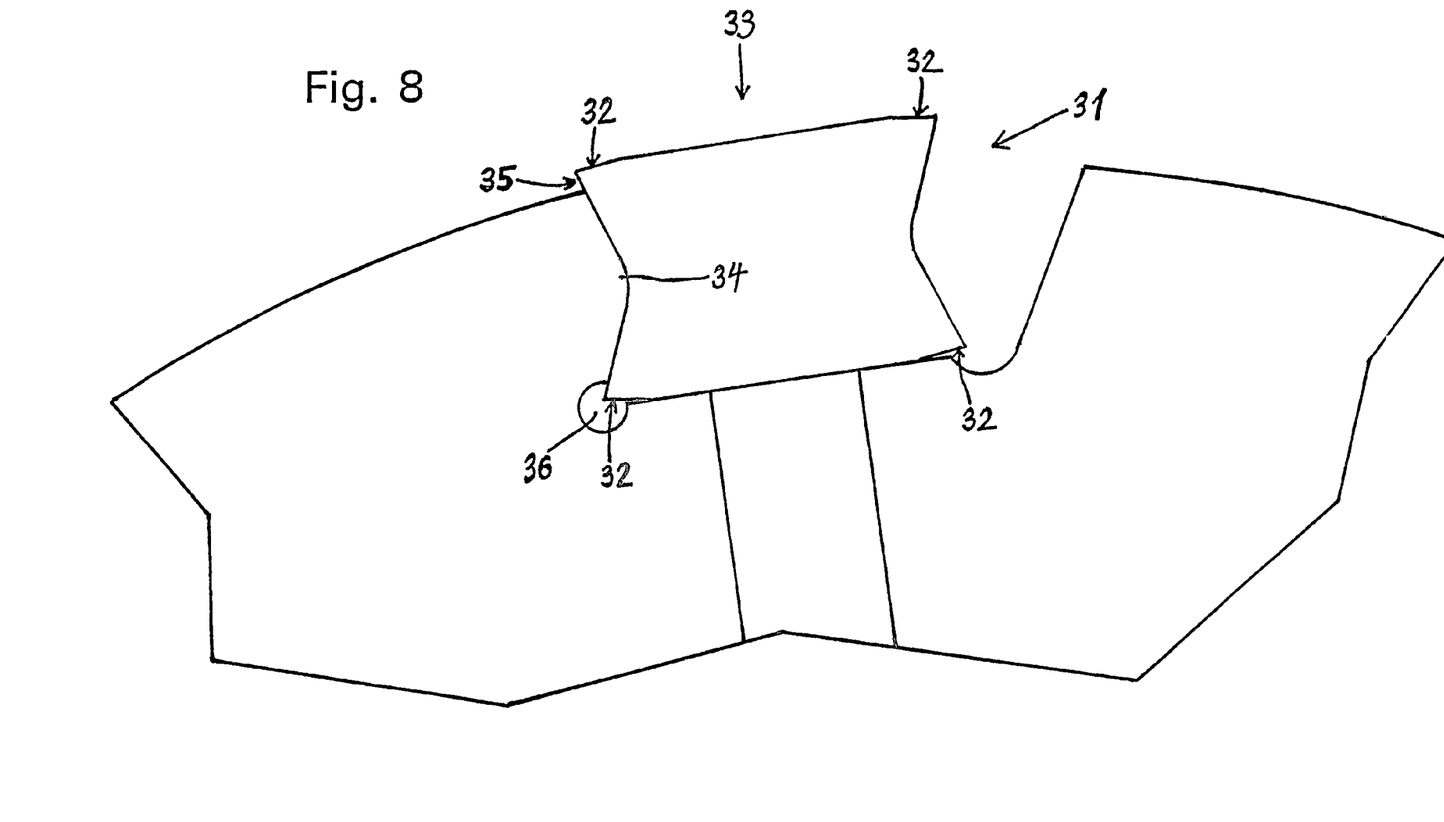
FIG. 8 shows a sixth indexable tip in cross-section corresponding to FIG. 3.

FIG. 8 shows an indexable tip 3 as the second variation mentioned above with flat bevels 32 at the free surface and supporting surface. It has a seat 33 in the corresponding tool with an abutment 34 which reinforces against the cutting force and is complementary to the indentation 4 also provided here.

A free space 36 which is guided around the possible cutting edge is also furnished here. The bevel angle is for example 5° and the clearance angle is for example 3° at the bevel and 8° at the remaining free surface.

The plate seat in the tool is preferably aligned toward the tool axis of rotation such that the cutting edge grips in an inclined and shearing position into the material and creates a short "comma-shaped chip".

The indexable tip according to the invention is intended for the beveling of edges in the broadest sense for angles of 0 to 85° by means of cylindrical or conical milling heads. The application of welding bevels, optical bevels and edge roundings to linear edges and contours of workpieces made of aluminum (alloys), steel and other higher strength materials are particularly taken into account.

The indexable tips which generally have a length of 6 to 30 mm can also be arranged on the milling head in longitudinal direction successively back-to-back or staggered.

Reground indexable tips generally receive the same after-treatment at the edges as during production, so that they are then as new. These after-treatments include regrinding of the mentioned narrow slots or narrow bevels at the faces and/or free surfaces, likewise roundings of the cutting edges for the removal of major sharpness as well as the renewal of an existing coating if necessary, for example of titanium nitride.

The invention claimed is:

1. An indexable tip for mobile hand beveling by means of a milling machine with a conical milling head with ground cutting edges and a bore hole extending from the free surface to the supporting surface of the indexable tip for the passage of a fastening means having a head and being configured to be reversed by turning around the indexable tip about the axis of the bore hole, wherein the indexable tip also is reversible by turning around which involves interchanging the prior supporting surface and free surface, wherein the wedge angle of the cutting edges created at the even faces is 40 to 750° and the wedge angle of the cutting edges created at the concave faces is 10 to 60°, and wherein the tip is configured for mounting on a seat surface of the milling head, upon which its effective rake angle is 6 to 47° for even faces, and 15 to 75° for conical faces, and its clearance angle is 2 to 25°.

2. The indexable tip according to claim 1, wherein both the surfaces have a width of 5.5 to 12 mm.

3. The indexable tip according to claim 1, wherein the tip exhibits a grooving at those sides exhibiting the possible faces, which forms both the concerned faces and which, aside from possible inward or outward bends of its edges forming the cutting edges, has a continuously constant and mirror image cross-section relative to the midplane of the indexable tip which cuts the bore hole.

4. The indexable tip according to claim 3, wherein both faces are even and are positioned at an angle of 80 to 160° relative to each other.

5. The indexable tip according to claim 3, wherein both the faces are concave according to the grooving of round cross-section.

6. The indexable tip according to claim 1, wherein the tip exhibits at the cutting edges a narrow slot in the face.

7. The indexable tip according to claim 1, wherein one possible face opposing the respective used face at the free space is provided for the sole support of the indexable tip against the cutting force at an identically aligned sloping of the milling head in interaction with the fastening of the indexable tip on the seat surface of the milling head by means of the fastening means.

8. The indexable tip according to claim 1, comprising a milling head on which a free space is formed which extends around the cutting edges located between the sloping in the sear surface.

9. The indexable tip according to claim 1, wherein the indexable tip, as a result of a thickness increase raising the first-mentioned surfaces over the head of the intended fastening means, with which the thickness of the indexable tip exceeds the depth of the intended seat of the indexable tip on the tool, can be reground for sharpening the cutting edges.

10. The indexable tip according to claim 7, wherein the tip can be reground at the first-mentioned surfaces as well as at the faces.

11. The indexable tip according to claim 9, wherein the tip is beveled at the first-mentioned surfaces at a flat angle of 2 to 10° toward the faces and can be reground at the bevel surfaces and is intended for configuration on a seat surface of the milling head which is slanted under the clearance angle enlarged by the bevel angle.

12. The indexable tip according to claim 1, wherein the tip has the shape of a rectangle or of a square.

13. The indexable tip according to claim 1, wherein the tip exhibits flat cavities molded at its first-mentioned surfaces which create with outlets at the faces each an indented cutting edge.

14. The use of an indexable tip according to claim 1, particularly for applying welding bevels, optical bevels and edge roundings to linear edges and contours of work-pieces of aluminum (alloys), steel and other higher strength materials.

* * * * *